United States Patent Office 3,772,410
Patented Nov. 13, 1973

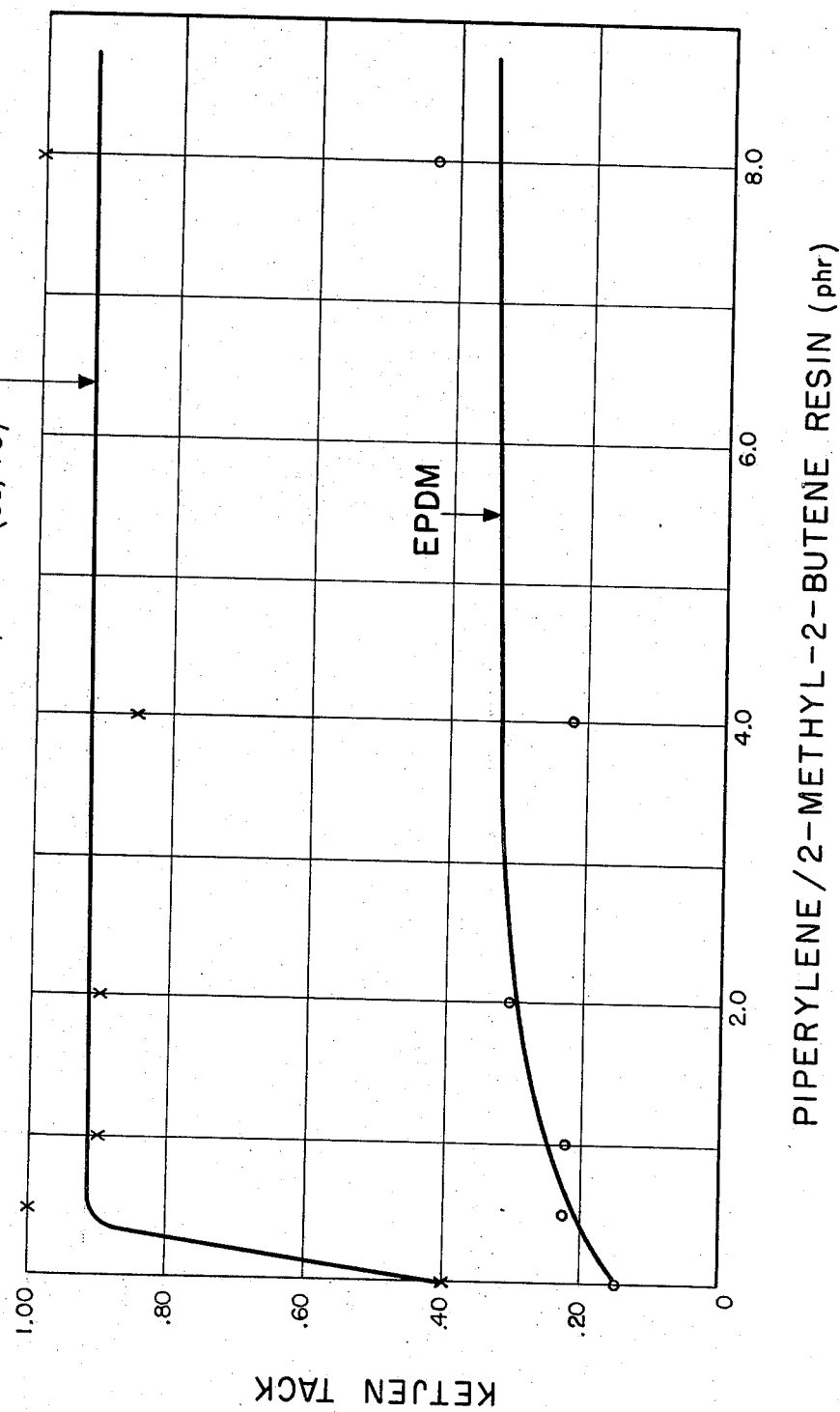

3,772,410
TACK IN ETHYLENE-PROPYLENE RUBBERS BY ADDING A $C_5$–$C_{10}$ OLEFIN POLYMER AND A TACKIFIER
Joginder Lal, Akron, and Paul H. Sandstrom, Tallmadge, Ohio, assignors to The Goodyear Tire & Rubber Company, Akron, Ohio
Filed July 1, 1971, Ser. No. 158,719
Int. Cl. C08f 29/12
U.S. Cl. 260—897 A                    15 Claims

ABSTRACT OF THE DISCLOSURE

The building tack of ethylene-propylene rubber (EPM) or ethylene-propylene-diene rubber (EPDM) is synergistically increased by the addition thereto of (1) up to 5.0 p.h.r. of a conventional tackifier and (2) a polymer of $C_5$–$C_{10}$ α-olefin (when employing a peroxide cure) of a copolymer of (a) 80–98% of a $C_5$–$C_{10}$ α-olefin and (b) 20–2% of a $C_5$–$C_{30}$ non-conjugated diene or polyene (when employing a sulfur cure). The weight ratio of EPM or EPDM to such polymer or copolymer is between 90:10 and 50:50.

This invention relates to a method of imparting building tack to certain synthetic rubber stocks and to the resulting rubber stocks which possess excellent tack. More particularly, this invention relates to improving the tack of ethylenepropylene rubbers by admixing therewith conventional tackifiers and either a rubbery polymer of an α-olefin (for peroxide cure) or a copolymer containing a major portion of such α-olefin and a minor portion of a non-conjugated diene and the resulting rubber stocks.

DEFINITIONS

"Ethylene-propylene rubbers" means a polymer consisting of EPM and/or EPDM.

"EPM" means an ethylene-propylene rubber containing from about 20 to 75 weight percent of ethylene and from about 80 to 25 weight percent propylene.

"EPDM" means an ethylene-propylene-diene rubber containing from about 20 to 75 weight percent ethylene, from about 80 to 25 weight percent propylene, and a minor proportion of from about 1 to 15 weight percent of a $C_5$–$C_{30}$ non-conjugated diene.

"Phr." means parts per hundred total rubber, by weight.

"Ketjen tack" means that value of tack as measured on a Ketjen Tackmeter.

BACKGROUND

Building tack is generally referred to as the surface property of rubber which enables two pieces of unvulcanized rubber stock to adhere together when brought in contact under moderate pressure. It is generally measured by the amount of force required to separate two pieces of such rubber stock during a short period of time. One convenient method of evaluating building tack is by the use of a Ketjen Tackmeter. Tack is an important and necessary property of various rubber stocks in their uncured state in order that they may be commercially useful in the manufacture of tires, industrial products, rubberized fabrics and adhesives, and, where the natural tack of a rubber stock is insufficient, a compound, generally referred to as a tackifier, must be mixed with it to increase the building tack to an acceptable level. The problem of an acceptable tack, while a matter of concern with all rubber products, is particularly evident in certain synthetic rubber stocks which have little inherent building tack.

It is well known that ethylene-propylene rubbers offer many superior qualities, particularly excellent resistance to ozone and aging, and good flex properties, abrasion resistance, and tensile strength. In addition, these elastomers have high molecular weight and may be heavily extended with filler and/or extending oil in the interest of economy and imparting certain desirable properties to the finished product. However, the lack of building tack in these rubbers constitutes a serious limitation in many applications and especially where successeive laminations are employed in constructions such as belts.

It has been previously discovered that at least one class of synthetic resin functions to a limited degree as a tackifier for ethylene-propylene rubbers. This resin may be prepared by polymerizing a mixture comprising about 20 to 75 weight percent of piperylene and from about 80 to about 25 weight percent of 2-methyl-2-butene in the presence of an anhydrous aluminum chloride catalyst. Preferably the mixture to be polymerized comprises about 35 to about 65 weight percent of piperylene and from about 65 to about 35 weight percent of 2-methyl-2-butene. This resin may be modified by the addition to the polymerization mixture of up to 50 weight percent of piperylene dimer or trimer or other unsaturated hydrocarbon, particularly hydrocarbons containing from 4 to 6 carbon atoms (e.g. 2-methyl-1-butene; pentenes and substituted pentenes; hexenes, such as 2-hexene; diolefins, such as isoprene; and cyclic unsaturated hydrocarbons, such as cyclohexene). This resin has a softening point of from about 80° C. to 110° C. (ASTM Method E28–58T). It usually has a specific gravity range of from about 0.85 to about 1.0 and may be steam stripped to increase the softening point to around 90° C. to 110° C. The resin is generally soluble in aliphatic hydrocarbons, such as pentane, and aromttic hydrocarbons, such as benzene. It is further characterized by having a composition comprising from about 40–80 weight percent units derived from piperylene and from about 60 to 20 weight percent units derived from 2-methyl-2-butene. Its composition and use is more fully described in U.S. Pat. No. 3,509,239 issued Apr. 28, 1970.

While the tackifier referred to hereinabove, as well as other conventional tackifiers, result in some improvement and may be usable in certain applications, the tack characteristics of such rubber is frequently marginal at best and often below the level necessary to fabricate products such as rubber belts for snowmobiles.

INVENTION

Applicants have now discovered that when any conventional tackifier (including, but not limited to, the piperylene/2-methyl-2-butene type described hereinabove) is incorporated in EPM or EPDM together with a rubbery polymer prepared from a $C_5$–$C_{10}$ α-olefin (where a peroxide cure is anticipated) or a copolymer formed by copolymerizing such $C_5$–$C_{10}$ α-olefin together with a $C_5$–$C_{30}$ non-conjugated diene or polyene (where a sulfur cure is anticipated), that the tackifying effect on EPM or EPDM (respectively) is dramatically increased in a nonadditive manner.

It will be apparent to persons familiar with EPM or EPDM rubber that where the copolymer was compounded with the EPDM, a sulfur cure may be employed and will generally be preferable. Where, however, the rubbery polymer or copolymer is employed with EPM or where the rubbery polymer is compounded with EPDM, a peroxide cure will be required. Furthermore, when ethylene-propylene rubbers are blended with up to 50 phr. of such polymer or copolymer of $C_5$–$C_{10}$ α-olefin (as described above), the blend stocks exhibit superior processibility particularly on a 2-roll mill and enhanced extrudability as compared with the corresponding stock prepared without the addition of such $C_5$–$C_{10}$ α-olefin polymer or copolymer. The blends also possess significantly lower Mooney viscosity and thus require a lower power comsumption for mixing, for instance in a Banbury, and other similar operations.

RUBBERY POLYMER/COPOLYMER

The rubbery polymer or copolymer employed in the practice of the invention is either a polymer of at least one $C_5$-$C_{10}$ α-olefin (or mixtures thereof) or a copolymer of 80-98 weight percent of at least one $C_5$-$C_{10}$ α-olefin (or mixtures thereof) and 20-2 weight percent of at least one $C_5$-$C_{30}$ non-conjugated diene (or mixtures thereof). The ratio of EPM or EPDM rubber to the polymer or copolymer is between about 90:10 and 50:50. A ratio of about 70:30 gives excellent results. Where the basic rubber is EPM and therefore requires a peroxide cure for vulcanization, a $C_5$-$C_{10}$ α-olefin polymer may be employed rather than the copolymer since the unsaturation in the copolymer of the non-conjugated diene is introduced for the purpose of permitting a sulfur cure. It is evident, however, that the copolymer, while unnecessary, would function in the practice of the invention with EPM. Where the basic rubber is EPDM, a copolymer of 80-98 weight percent of a $C_5$-$C_{10}$ α-olefin and 20-2 weight percent of a $C_5$-$C_{30}$ non-conjugated diene may be employed to permit the sulfur cure.

Typical examples of EPDM are terpolymers of ethylene, propylene, and a suitable diene such as 1,4-hexadiene, dicyclopentadiene, ethylidene norbornene, or methylene norbornene.

Typical examples of $C_5$-$C_{10}$ α-olefin are 1-pentene, 1-hexene, 1-octene, and 1-decene.

Typical examples of a $C_5$-$C_{10}$ non-conjugated diene and polyenes are 1,4-pentadiene, 1,4-hexadiene, 1,5-hexadiene (biallyl), 2-methyl-1,5-hexadiene, 4-methyl-1,4-hexadiene, 5-methyl-1,4-hexadiene, 3,3-dimethyl-1,5-hexadiene, 1,7-octadiene, 1,9-decadiene, 1,19-eicosadiene, 5-vinyl norbornene, 5-ethylidene norbornene, 5-(3-butenyl)-norbornene, and the like.

TACKIFIERS

Known commercially available tackifiers which may be employed in the practice of this invention are: "Piccolyte" S-125 (T.M. Pennsylvania Industrial Chemical Corporation); "Pentalyn" H (T.M. Hercules, Inc.); "Polypale" (T.M. Hercules, Inc.); "SP-1068" (T.M. Schenectady Chemicals Co.); "Bardol" (T.M. Allied Chemical Co.); "Staybelite Ester" No. 10 (T.M. Hercules, Inc.); and "Wing-tack 95" (T.M. The Goodyear Tire & Rubber Company).

Applicants have experimentally employed a number of such commercial tackifiers and find that all perform satisfactorily in the practice of the invention. The tackifier may be mixed with the rubber and reinforcing agent, if required, directly in the Banbury, or may be added to the rubber or the rubber stock containing reinforcing agent on the mill. The amount of tackifier employed in the practice of the invention is generally less than 5 phr. and may be determined to be as little as 1 phr. or less. Larger amounts may be used as is shown in the examples but these larger amounts do not significantly improve the tack since excellent tack is achieved with 5 phr. or less of tackifying agent. The improvement in tack resulting from the synergistic effect of using a tackifier and α-olefin polymer or copolymer is in marked contrast to the improvement in tack which results from the addition of the conventional tackifier alone. As shown in the accompanying drawing, the addition of a piperylene/2-methyl-2-butene tackifying agent alone to EPDM only slowly increases the Ketjen tack value through the addition of up to 6 or more phr. of such tackifying agent. In addition, it should be noted that the increase in tack value resulting from the use of the tackifying agent alone produces only a modest increase in tack value which, as previously noted, is frequently unsatisfactory for certain applications. Even with 8 phr. of this resin, the EPDM compounded stock only exhibits tack which is equivalent to the tack value of a 30/70 hexene copolymer/EPDM blend free from such resin. The addition of 1 phr. of the resin to the blend stock significantly increases the tack to a value which is completely acceptable for fabricating of rubber goods.

The practice of this invention is illustrated by reference to the following examples which are intended to be representative rather than restrictive of the scope of this invention.

EXAMPLE 1

(A) Elastomers.—Several copolymers of α-olefins with methyl hexadiene were synthesized according to known procedures and are shown in Table I(A). EPDM rubbers used for preparing blends are shown in Table I(B).

(B) Test sample preparation.—The elastomers were mixed with 50 phr. ISAF carbon black in a Banbury. The black stocks, 150 parts, were compounded with a butyl rubber curing recipe (Table II) on a 2-roll mill. The stocks were sheeted out to 0.06" thickness and were subsequently cut into 1" x 9" sheeted test strips. The smoother side of the strip was reserved for tack measurement on a Ketjen Tackmeter. Test plies were made by covering the other side of strip with masking tape.

(C) Tack test conditions:

Pressure—2 atmosphere
Pressure time—30 sec.
Relaxation time—5 sec.
Separation speed—9"/min.
Effective width—⅛"

The plies were separated by means of a polyester film which had a ⅛" wide window.

(D) Results.—Since it is difficult to avoid slight differences in surface smoothness, ply thickness, and sample aging from one series to another, comparison of data is more relevant when examined within a given series.

The data in Table III show the poor tack of EPDM to itself. It further discloses that the addition of various known tackifiers to EPDM has little, if any, effect on the tack strength. It also discloses that the addition of 30 phr. of a copolymer of hexene and methyl hexadiene to EPDM results in a noticeably improved tack strength. However, the addition of the same tackifiers to EPDM/ hexene copolymer blends, particularly at 30 phr. hexene copolymer, yields compositions of substantially higher tack strength.

In Table IV, blends of EPDM with the copolymers prepared from octene, decene, and a $C_6$-$C_{10}$ α-olefin mixture demonstrate behavior similar to that observed in Table III with EPDM/hexene copolymer blends. There is further increase in tack values of the blends of EPDM with the octene and decene copolymers when 2 phr. of a piperylene/2-methyl-2-butene tackifying resin is also incorporated. Although the blend of EPDM and the pentene copolymer does not result in improvement in the tack, the data disclose that the addition of the tackifier in conjunction with the pentene copolymer does improve the tack.

The data in Table V show that a significant improvement in the tack strength of another EPDM rubber, employing dicyclopentadiene as the diene monomer, is obtained by the addition of hexene/methyl hexadiene copolymer and a piperylene/2-methyl-2-butene tackifying resin. Blends of a 1,4-hexadiene-type EPDM, hexene copolymer prepared from trans-1,4-hexadiene, and a piperylene/2-methyl-2-butene tackifying resin also exhibit high tack strength similar to that obtained when hexene copolymer prepared from methyl hexadiene is used.

Results on stress-strain and tear strength properties of a 1,4-hexadiene type EPDM/hexene copolymer 70/30 blend are given in Table VI. Increasing the amount of piperylene/2 - methyl-2-butene tackifying resin decreases slightly the cross-link density of the vulcanizates [as shown by 300% modulus and swelling ratio (Q) values], accompanied by an increase in tensile strength and elongation at break.

TABLE I

A. Copolymers of α-Olefins with Methyl Hexadiene [a]

| α-Olefin | Molar ratio [b] | Inherent viscosity, dl./g. |
|---|---|---|
| 1-pentene | 90:10 | 3.5 |
| 1-hexene | 96:4 | 5.5 |
| 1-octene | 97:3 | 4.1 |
| 1-decene | 97:3 | 3.5 |
| C₅-C₁₀ mixture [c] | 97:3 | 4.7 |

B. EPDM

| Rubber | Source | Diene |
|---|---|---|
| Nordel 1070 | Du Pont | 1,4-hexadiene. |
| Royalene 301T | Uniroyal | Dicyclopentadiene. |

[a] 80:20 mixture of 4- and 5-methyl-1,4-hexadienes.
[b] Molar charge ratio of α-olefin to methyl hexadiene.
[c] Mixture of 1-hexene, 1-octene, and 1-decene (1:1:1 by weight).

TABLE II.—COMPOUNDING RECIPE (Parts by wt.)

| | |
|---|---|
| Black stock | 150 |
| Zinc oxide | 5 |
| Sulfur | 2 |
| Captax [a] | 0.5 |
| Tuads [b] | 1 |
| Tackifiers | As indicated |

[a] 2-mercaptobenzothiazole.
[b] Tetramethylthiuram disulfide.

TABLE III

Tackstrength (kg.) of EPDM ([a])/Hexene Copolymer ([b]) Blends

| Tackifier | Phr. | EPDM([a]) | EPDM([a])/hexene copolymer ([b]) 90/10 | 80/20 | 70/30 | Series No. |
|---|---|---|---|---|---|---|
| None | | 0.14 | 0.12 | 0.10 | 0.63 | A |
| Piperylene/2-methyl-2-butene ([c]) | 0.5 | 0.14 | 0.19 | 0.28 | 0.60 | A |
| Do | 1.0 | 0.12 | 0.11 | 0.25 | 0.78 | A |
| None | | 0.20 | 0.18 | 0.19 | 0.33 | B |
| Piperylene/2-methyl-2-butene | 2.0 | 0.18 | 0.25 | 0.33 | 0.60 | B |
| Do | 5.0 | 0.25 | 0.25 | 0.45 | 0.78 | B |
| Phenolic thermoplastic ([d]) | 0.5 | 0.18 | 0.25 | 0.50 | 0.45 | B |
| Do | 1.0 | 0.24 | 0.25 | 0.25 | 0.58 | B |
| Do | 2.0 | 0.15 | 0.30 | 0.30 | 0.68 | B |
| None | | 0.36 | | | 0.86 | C |
| Piperylene/2-methyl-2-butene | 2.0 | 0.25 | | | 1.04 | C |
| Phenolic thermoplastic | 2.0 | 0.20 | | | 1.30 | C |
| Coal-tar oil ([e]) | 2.0 | 0.20 | | | 0.97 | C |
| Glycerol ester of hydrogenated rosin ([f]) | 2.0 | 0.25 | | | 1.06 | C |

[a] Ethylene/propylene/1.4-hexadiene terpolymer ("Nordel 1070." TM—Du Pont).
[b] Prepared from 1-hexene and an 80:20 mixture of 4- and 5-methyl-1.4-hexadienes (4 mole percent).
[c] "Wing-tack 95" (TM—The Goodyear Tire & Rubber Company).
[d] "SP-1068" Resin (TM—Schenectady Chemicals).
[e] "Bardol" (TM—Allied Chemical).
[f] "Staybelite Ester 10" (TM—Hercules Co.).

TABLE IV

Tackstrength (kg.) of EPDM [a]/α-Olefin Copolymer [b] Blends

| | | | EPDM [a]/α-olefin copolymer, 70/30 | | | |
|---|---|---|---|---|---|---|
| Tackifier | Phr. | EPDM [a] | Pentene copolymer | Octene copolymer | Decene copolymer | C₅-C₁₀ copolymer |
| None | | 0.20 | 0.20 | 0.50 | 0.27 | 0.75 |
| Piperylene/2-methyl-2-butene [c] | 2.0 | 0.17 | 0.28 | 0.68 | 0.48 | 0.78 |

[a] Ethylene/propylene/1,4-hexadiene terpolymer ("Nordel 1070," TM—Du Pont).
[b] See Table I for copolymer composition.
[c] "Wing-tack 95" (TM—The Goodyear Tire & Rubber Company).

TABLE V

Tackstrength of EPDM/Hexene Copolymer Blends

| Tackifier | Phr. | EPDM [a] | EPDM [a]/hexene copolymer,[b] 70:30 |
|---|---|---|---|
| None | | 0.15 | 0.45 |
| Piperylene/2-methyl-2-butene [c] | 2.0 | 0.14 | 0.55 |

| | | EPDM [c] | EPDM [c]/hexene copolymer,[d] 70:30 |
|---|---|---|---|
| None | | 0.15 | 0.25 |
| Piperylene/2-methyl-2-butene | 2.0 | 0.15 | 0.70 |

[a] Ethylene/propylene/dicyclopentadiene terpolymer ("Royalene 301T," TM—Uniroyal).
[b] Prepared with 4 mole percent of 80:20 mixture of 4- and 5-methyl-1,4-hexadiene and 1-hexene.
[c] Ethylene/propylene/1,4-hexadiene terpolymer ("Nordel 1070," TM—Du Pont).
[d] Prepared with 5 mole percent trans-1, 4-hexadiene and 1-hexene (inherent viscosity 1.2 dl./g.).
[e] "Wing-tack 95" (TM—The Goodyear Tire & Rubber Company).

TABLE VI

Physical Properties [a] of Vulcanizates [b] of EPDM [c]/Hexane Copolymer [d] Blend

| Composition | Piperylene/2-methyl-2-butene.[e] phr. | Tensile strength. p.s.i. | Elongation at break. percent | 300% modulus. p.s.i. | Crescent tear. lbs./in., 212° F. | Q[f] | Solubility percent |
|---|---|---|---|---|---|---|---|
| EPDM [c] | 0 | 3,947 | 513 | 1,594 | 81 | 2.1 | 8.4 |
| | 2 | 4,233 | 573 | 1,360 | 82 | 2.3 | 10.1 |
| | 5 | 4,506 | 600 | 1,339 | 81 | 2.4 | 13.1 |
| EPDM [c]/hexane copolymer.[d] 70/30 blend | 0 | 2,766 | 410 | 1,746 | 59 | 2.3 | 6.6 |
| | 2 | 2,889 | 477 | 1,533 | 68 | 2.4 | 8.2 |
| | 5 | 3,106 | 530 | 1,244 | 68 | 2.5 | 9.5 |

[a] Properties indicated are average of three tested samples.
[b] 50 phr. ISAF. Cure: 30'/310° F. for all samples.
[c] Ethylene/propylene/1,4-hexadiene terpolymer ("Nordel 1070". TM—Du Pont).
[d] Prepared from 1-hexene and an 80:20 mixture of 4- and 5-methyl-1, 4-hexadiene (4 mole percent).
[e] "Wing-tack 95" (TM—The Goodyear Tire & Rubber Company).
[f] Swelling ratio (Q) defined as grams of toluene per gram of vulcanizate gel.

EXAMPLE 2

The beneficial effect of adding hexene copolymer to EPDM on Ketjen tack values of three compounded stocks is shown below in Table VII. The tackifier, 2 phr. of piperylene/2-methyl-2-butene resin, was milled into 150 parts of the black stock containing 50 phr. ISAF carbon black. The resulting stocks were allowed to stand for several days, and thereafter were compounded on a mill with 5 phr. zinc oxide, 2 phr. sulfur, 0.5 phr. captax and 1 phr. tuads.

TABLE VII

|  | EPDM | Hexene copolymer[a]/EPDM[b] 20/80 | Hexene copolymer[a]/EPDM[b] 30/70 |
| --- | --- | --- | --- |
| Tack value | 0.15 | 0.9 | 1.5 |

[a] Prepared from 1-hexene and an 80:20 mixture of 4- and 5-methyl-1,4-hexadiene (3 mole percent).
[b] Ethylene/propylene/1,4-hexadiene terpolymer ("Nordel 1070", TM—Du Pont).

Both blends show tack values which would be characterized as excellent for factory production purposes.

Suitable (reinforcing and/or non-reinforcing) fillers, fibers, pigments, plasticizers, age resistors, fatty acids, and other ingredients known in the art may be used in compounding to modify the processing characteristics, ultimate properties of the finished product, or control cost. Such compounding technology is described in references such as the Vanderbilt Rubber Handbook, R. T. Vanderbilt Company, Inc., 1968; Technical Report on Nordel, E. I. du Pont de Nemours and Company, Inc., 1964; Introduction to Rubber Technology, M. Morton, Editor, Reinhold Publishing Corp., 1959; Impregnated Glass Fiber Rubber Reinforcement, A Marzochi, Rubber Division Meeting of the American Chemical Society, October 1970.

While certain representative embodiments and details have been shown for the purpose of illustrating the invention, it will be apparent to those skilled in this art that various changes and modifications may be made therein without departing from the spirit or scope of the invention.

What is claimed is:

1. The method of improving the tack of ethylene-propylene rubber containing from about 20 to 75 weight percent of ethylene and from about 80 to 25 weight percent propylene or ethylene-propylene-diene rubber containing from about 20 to 75 weight percent ethylene, from about 80 to 25 weight percent propylene, and a minor proportion of from about 1 to 15 weight percent of a $C_5$–$C_{30}$ non-conjugated diene, by admixing therewith (1) a tackifier in an amount from 0.5 to 5 phr. and (2) 10 to 50 phr. of a rubbery polymer of at least one $C_5$–$C_{10}$ α-mono-olefin or a copolymer of 80–98 weight percent of at least one $C_5$–$C_{10}$ α-mono-olefin and 20–2 weight percent of at least one $C_5$–$C_{30}$ non-conjugated diene.

2. The method of claim 1 wherein the tackifier (1) is a copolymer of 20–75 weight percent of piperylene and 80–25 weight percent of 2-methylene-2-butene.

3. The method of claim 1 wherein the rubbery polymer (2) is poly 1-hexene.

4. The method of claim 1 wherein the tackifier (1) is a copolymer of 20–75 weight percent of piperylene and 80–25 weight percent of 2-methyl-2-butene and the rubbery polymer (2) is poly 1-hexene and such rubbery polymer is present in an amount of about 30 phr.

5. The method of claim 1 wherein the tackifier (1) is a copolymer of 20–75 weight percent of piperylene and 80–25 weight percent of 2-methyl-2-butene and the rubbery polymer (2) is a copolymer of 80–98 weight percent of 1-hexene and 20–2 weight percent of a $C_5$–$C_{30}$ non-conjugated diene and such rubbery polymer is present in the amount of about 30 phr.

6. The method of claim 1 wherein the diene in the ethylene-propylene-diene rubber is 1,4-hexadiene or dicyclopentadiene and the tackifier (1) is a copolymer of 20–75 weight percent of piperylene and 80–25 weight percent of 2-methyl-2-butene and the rubbery polymer (2) is a copolymer of 80–98 weight percent of 1-hexene and 20–2 weight percent of a $C_5$–$C_{30}$ non-conjugated diene and such rubbery polymer is present in an amount of about 30 phr.

7. A composition comprising ethylene-propylene rubber containing from about 20 to 75 weight percent of ethylene and from about 80 to 25 weight percent propylene or ethylene-propylene-diene rubber containing from about 20 to 75 weight percent ethylene, from about 80 to 25 weight percent propylene, and a minor proportion of from about 1 to 15 weight percent of a $C_5$–$C_{30}$ non-conjugated diene, and (1) a tackifier in an amount from 0.5 to 5 phr. and (2) 10–50 phr. of a rubbery polymer of at least one $C_5$–$C_{10}$ α-mono-olefin or a copolymer of 80–98 weight percent of at least one $C_5$–$C_{10}$ α-mono-olefin and 20–2 weight percent of at least one $C_5$–$C_{30}$ non-conjugated diene.

8. The composition of claim 7 wherein the tackifier (1) is a copolymer of 20–75 weight percent of piperylene and 80–25 weight percent of 2-methyl-2-butene.

9. The composition of claim 7 wherein the rubbery polymer (2) is poly 1-hexene.

10. The composition of claim 7 wherein the tackifier (1) is a copolymer of 20–75 weight percent of piperylene and 80–25 weight percent of 2-methyl-2-butene and the rubbery polymer (2) is poly 1-hexene and such rubbery polymer is present in an amount of about 30 phr.

11. The composition of claim 7 wherein the rubbery polymer (2) is a copolymer of 80–98 weight percent of 1-hexene and 20–2 weight percent of a $C_5$–$C_{30}$ non-conjugated diene.

12. The composition of claim 7 wherein the tackifier (1) is a copolymer of 20–75 weight percent of piperylene and 80–25 weight percent of 2-methyl-2-butene and the rubbery polymer (2) is a copolymer of 80–98 weight percent of 1-hexene and 20–2 weight percent of a $C_5$–$C_{30}$ non-conjugated diene and such rubbery polymer is present in the amount of about 30 phr.

13. The composition of claim 7 wherein the diene in ethylene-propylene-diene rubber is 1,4-hexadiene or dicyclopentadiene and the tackifier (1) is a copolymer of 20–75 weight percent of piperylene and 80–25 weight percent of 2-methyl-2-butene and the rubbery polymer (2) is a copolymer of 80–98 weight percent of 1-hexene and 20–2 weight percent of a $C_5$–$C_{30}$ non-conjugated diene and such rubbery polymer is present in an amount of about 30 phr.

14. In compounding ethylene-propylene rubber containing from about 20 to 75 weight percent of ethylene and from about 80 to 25 weight percent propylene or ethylene-propylene-diene rubber containing from about 20 to 75 weight percent ethylene, from about 80 to 25 weight percent propylene, and a minor proportion of from about 1 to 15 weight percent of a $C_5$–$C_{30}$ non-conjugated diene, the improvement which comprises admixing therewith (1) a tackifier in an amount from 0.5 to 5 phr. and (2) 20–30 phr. of a rubbery polymer of at least one $C_5$–$C_{10}$ α-mono-olefin or a copolymer of 80–98 weight percent of at least one $C_5$–$C_{10}$ α-mono-olefin and 20–2 weight percent of at least one $C_5$–$C_{30}$ non-conjugated diene.

15. The compounding improvement of claim 14 wherein the rubber in ethylene-propylene-diene rubber and the tackifier (1) is a copolymer of 20–75 weight percent of piperylene and 80–25 weight percent of 2-methyl-2-butene and the rubber polymer (2) is a copolymer of 80–98 weight percent of 1-hexene and 20–2 weight percent of a $C_5$–$C_{30}$ non-conjugated diene and such rubbery polymer is present in an amount of about 30 phr.

References Cited

UNITED STATES PATENTS

| | | | |
|---|---|---|---|
| 3,514,417 | 5/1970 | Bickel et al. | 260—27 |
| 3,477,957 | 11/1969 | Hall | 252—59 |
| 3,456,038 | 7/1969 | Newman et al. | 260—878 |
| 3,299,183 | 1/1967 | Borghese | 260—897 |

MURRAY TILLMAN, Primary Examiner

C. J. SECCURO, Assistant Examiner

U.S. Cl. X.R.

260—27 R, 28.5 A, 41 R, 848, 897 R

PO-1050
(5/69)

UNITED STATES PATENT OFFICE
CERTIFICATE OF CORRECTION

Patent No. __3,772,410__   Dated __November 13, 1973__

Inventor(s) __Joginder Lal and Paul H. Sandstrom__

It is certified that error appears in the above-identified patent and that said Letters Patent are hereby corrected as shown below:

Column 1, line 18, "cure) of a" should read -- cure) or a --;
line 29, "ethylenepropylene" should read -- ethylene-propylene --;
line 37, "rubbers" should read -- rubber --;
Column 2, line 9, "successeive" should read -- successive --;
line 34, "aromttic" should read -- aromatic --;
Column 3, line 33, "$C_5$-$C_{10}$" should read -- $C_5$-$C_{30}$ --;
Column 5, line 7, in Table I, the heading "Inherent viscosity, db./g." should read -- Inherent viscosity, dl./g. --;
line 17, footnote (a) to Table I, "80:20 mixture of 4- and 5-methyl-1,4-hexadienes" should read -- 60:40 mixture of 4- and 5-methyl-1,4-hexadienes --;
in Table III, in footnote (b), "80:20 mixture of" should read -- 60:40 mixture of --;
in Table IV, under the heading "Decene copolymer" the figure "0.27" should read -- 0.28 --;
Column 6, in Table V, in footnote (b), "80:20 mixture of" should read -- 60:40 mixture of --;
in Table VI, the heading should read -- Physical Properties[a] of Vulcanizates[b] of EPDM[c]/Hexene Copolymer[d] Blend --;
in Table VI, under the heading "Composition", "EPDM[c]/hexane copolymer[d]" should read -- EPDM[c]/hexene copolymer[d] --;
in Table VI, the separation of the figures for the two compositions listed should be as follows:

```
              --       (     0
   EPDM[c]             (     2
                       (     5

EPDM[c]/            (     0
   hexene     [d]      (     2
   copolymer           (     5
   70/30 blend               --
```

-1-

Patent No. 3,772,410             Dated November 13, 1973

Inventors Joginder Lal and Paul H. Sandstrom

Column 6, in Table VI, in footnote (d) "80:20 mixture of"
               should read -- 60:40 mixture of --;
Column 7, in Table VII, the heading "Hexene copolymer[a] EPDM[b] 20/80"
               should read -- Hexene copolymer[a]/EPDM[b] 20/80 --;
      in Table VII, in footnote (a), "80:20 mixture of" should
               read -- 60:40 mixture of --;
      in Claim 2, line 64, "2-methylene-2-butene" should read
               -- 2-methyl-2-butene --;
Column 8, in Claim 15, line 72, "rubber in" should read -- rubber is --
               line 75, "rubber" should read -- rubbery --.

Signed and sealed this 2nd day of July 1974.

(SEAL)
Attest

EDWARD M. FLETCHER, JR.            C. MARSHALL DANN
Attesting Officer                   Commissioner of Patents